US011922901B1

(12) United States Patent
Fawcett

(10) Patent No.: US 11,922,901 B1
(45) Date of Patent: Mar. 5, 2024

(54) NORMALIZED BRIGHTNESS CONTROL FOR USER PERCEPTION OF VISUAL MEDIA

(71) Applicant: Snap Inc., Santa Monica, CA (US)

(72) Inventor: Rudd Fawcett, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/157,403

(22) Filed: Jan. 20, 2023

(51) Int. Cl.
*G09G 5/10* (2006.01)

(52) U.S. Cl.
CPC ......... *G09G 5/10* (2013.01); *G09G 2300/023* (2013.01); *G09G 2320/0233* (2013.01); *G09G 2320/0626* (2013.01); *G09G 2360/144* (2013.01)

(58) Field of Classification Search
CPC ............... G09G 5/10; G09G 2300/023; G09G 2320/0233; G09G 2320/0626; G09G 2360/144
See application file for complete search history.

(56) References Cited

U.S. PATENT DOCUMENTS 11,562,153 B1 * 1/2023 Etwaru ............... G06F 3/04842
11,756,493 B2 * 9/2023 Lee ..................... G09G 3/3433 345/204
2017/0309215 A1 * 10/2017 Perdices-Gonzalez ..................... G09G 3/32

* cited by examiner

*Primary Examiner* — Kevin M Nguyen
(74) *Attorney, Agent, or Firm* — Schwegman Lundberg & Woessner, P.A.

(57) ABSTRACT

A system and method for control of perceived brightness level in a display device based on the brightness of individual content items to provide a consistent viewing experience. This is a method of visual content-based brightness control. Adjusting the perceived display of individual visual content items does not rely on the adjustment of a display device's settings or controls, such as a general setting to control the brightness of a display screen, but rather evaluates the visual content being presented and adjusts the presentation layers for display of the visual content provided as part of the display screen. In this way, adjusting parameter(s) of one or more of these presentation layers provides control over the brightness level of the displayed content as a function of the brightness of the content.

20 Claims, 8 Drawing Sheets

NORMALIZED BRIGHTNESS CONTROL FOR USER PERCEPTION OF VISUAL MEDIA

The present disclosure relates generally to facilitating display of visual content on a display device.

BACKGROUND

Mobile devices are a critical part of daily communication, entertainment and work, where video, visual images and written materials are presented on a display screen. A common technology used for display presentation adjusts or controls the brightness of the display screen generally for all applications or uses. The screen is designed for display in a variety of conditions, which may be automatically set or controlled by a user: one may choose to reduce the brightness to save energy or for a more comfortable viewing experience, or may increase the brightness for additional visibility. This may be done in different lighting conditions. Existing mobile devices include an ambient light sensor to provide an ambient score that may, in conjunction with other factors, be used to determine a mode of display, such as decreased brightness, dark mode, true tone, night shift and others. For example, such an adjustment considers the environmental light in which the device operates and seeks to change as a function of the ambient score. Separately, these adjustments may be time-based according to a local sunset or sunrise and switch to adjust the monitor or screen.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
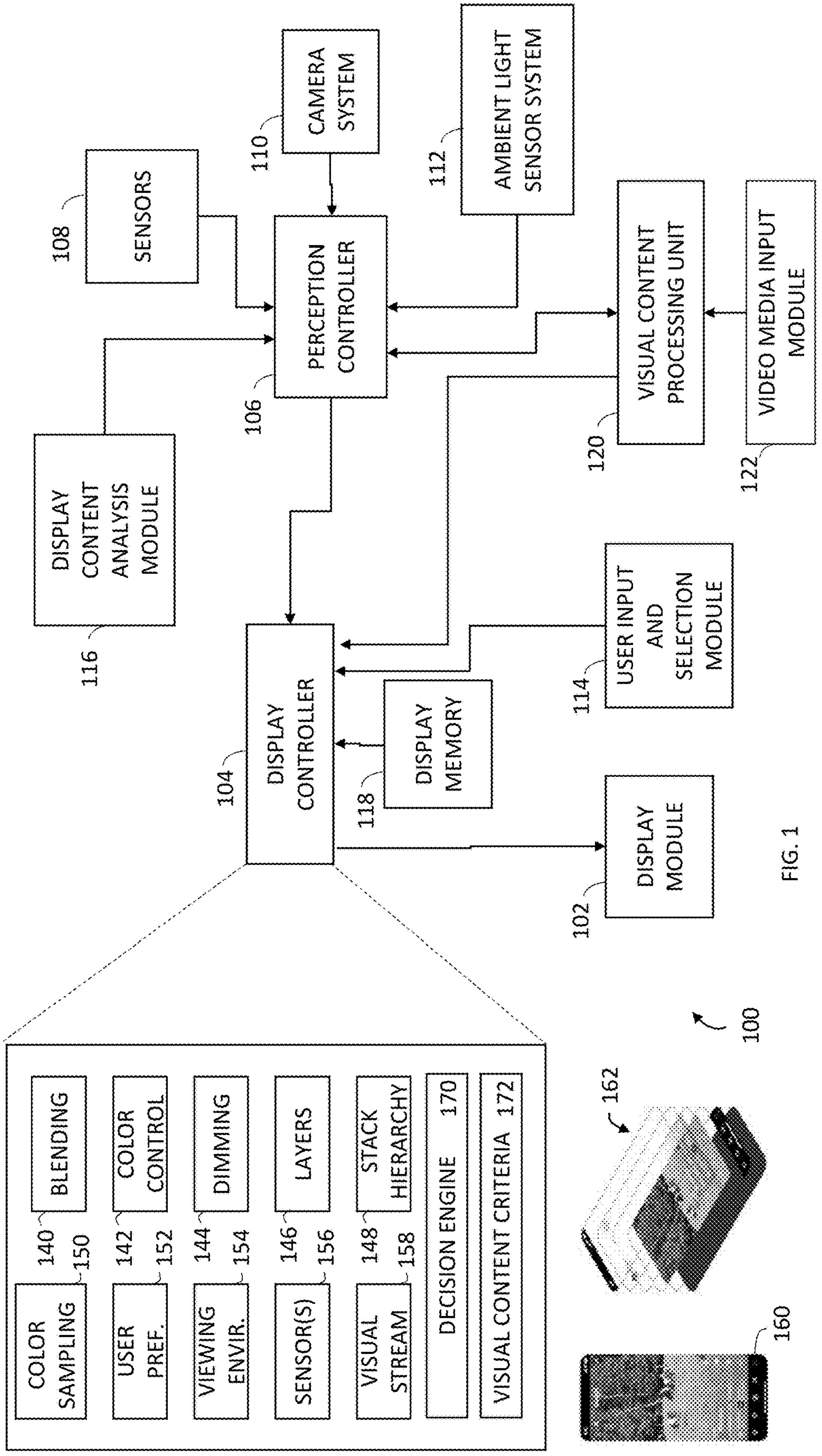
FIG. 1 is a diagrammatic representation of a display system, in accordance with some examples.

The presentation of images, videos and other media on a display device are presented by digitally controlling multiple layers of image. FIG. 1 illustrates a displayed image 160 of presented on a smart phone or other display device. The image 160 is created by use of multiple layers as illustrated in presentation layer stack 162. In a digitally controlled system, such as a photo editing system, the layers are abstractions, and represent relational series of pixelated flat layers. The layers are pixel-based and may be edited or modified by digital processors. There is generally an image layer, containing the image for display, and a background layer. The layers of presentation layer stack 162 are defined having a hierarchy with respect to each other. In the illustrated example of presentation layer stack 162, the image layer is positioned between multiple other layers, as detailed hereinbelow. The visual media is presented on an image layer, and referred to herein as a visual media layer. In a basic example, default condition of the layers may be considered as transparent layers of paper, each placed on top of each other to form a layer stack. When one of the layers presents the visual media or content, that layer is a visual media layer and layers above and below are designed to present the image for user presentation and often for user interaction with the device. A backing layer or background layer is a solid color layer that can be provided below the visual media layer in the stack. While there are a variety of ways to color the background layer, including non-uniform coloration, the examples described herein consider a solid color background layer with a default color of black. Adjustment to the color of the background is determined by color sampling of the visual media content.

In many scenarios, the digital layers default to a transparent state and then are adjusted by a designer. In the present examples, the system digitally controls layers of the presentation layer stack, such as presentation layer stack 162; as a function of specific information including, but not limited to, color sampling of the visual media, the content of the image presented in the visual image layer, the sequence of video images presented, the environment in which the user views the displayed image and so forth. The system controls the relationship of the individual layers and hierarchies based on these and other viewing criteria. FIG. 1 illustrates an example system 100 for such layer control based on viewing criteria.

The present inventions enhance operation of traditional display devices, wherein such traditional display devices (e.g., mobile devices, smart phones, and so forth) may be configured to adjust the brightness level of their display based on the environmental lighting conditions or user preferences. These adjustments are made to the display of the device to adjust the brightness level of the entire display uniformly. This may be done by increasing or decreasing the strength of the backlighting of the display of the display device or by other means in non-backlit displays.

Conventional display control applies brightness control to the device and changes the display of the visual content with a generalized brightness adjustment. Such universal control may be effective when the visual content presented on the display is generated in a consistent manner such that the brightness level of each of the visual content items is relatively similar; however, this is not always the case. For example, many current applications (apps and services) allow users to view visual content (e.g., videos, photos) created by other users where the creation is done in varying lighting environments with varying types of equipment (e.g., cameras, flash lighting). As a result, the brightness level of each visual content item may vary. For example, a video captured at night may be darker than a video captured during the day. For display of video content, the brightness of visual content items may change dramatically from one frame to a next. In these types of situations, a generalized brightness adjustment based on the environmental lighting conditions of a display device may result in an inconsistent and diminished viewing experience as users scroll through or otherwise view different content items. For example, each visual content item will be presented at a consistent brightness level (e.g., increased or decreased brightness level) for all viewing conditions, such as the environmental lighting conditions in which the user is viewing content on the display device. This creates a different user perception of content in different environments without regard to the brightness level of the individual visual content items.

To alleviate this and other issues with traditional display devices, the system 100 of FIG. 1 controls the perceived brightness level of individual content items to provide a consistent viewing experience. This is a method of visual content-based control including brightness control. The present inventions present methods of digitally controlling a perception created by the display device by providing dynamic and relational control based on a set of viewing criteria. This automated control provides enhanced viewer experience and particularly enhances current and developing video viewing apps and services. As the display device is made up of multiple presentation layers in a stack, the present inventions allow definition of relationships and adjustments to achieve a desired user perception without the use of conventional overall brightness adjustments. The system adjustments presented in the examples herein allow differentiation of presentation based on the image presented, the brightness and coloring of the image, the environment in which the image is viewed and the contrast of images in sequential video streams.

In the present examples, adjusting the perceived display of individual visual content items does not rely on the adjustment of a display device's settings or controls, such as a general setting to control the brightness of a display screen, but rather evaluates the visual content being presented and adjusts the presentation layers for display of the visual content provided as part of the display screen. In this way, adjusting parameter(s) of one or more of these presentation layers provides control over the brightness level of the displayed content as a function of the brightness of the content. In some examples discussed herein, the perceived brightness of the content presented on a display device may be modified by adjusting display parameters of at least one layer of a set of layers of the visual content item being presented. Various parameters may be adjusted or controlled, such as the opacity, color, and/or shade of a given layer or layers, the number of layers, and the like. Layering and publication of visual content is discussed hereinbelow. Adjusting the perceived display of individual visual content items is based on aspects of the visual content being presented and adjusts the presentation layers for display of the visual content on the display screen. In this way, the user's experience is determined based on an analysis of the visual content and not merely by general brightness settings of the display device.

The layer parameters include the opacity, shading or color of a given layer or layers of a visual content item that causes an adjustment to the perceived brightness of the visual content item when presented on the display. As mentioned above, the display device includes multiple presentation layers. To adjust the resultant visual display, some examples, incorporate a process of layer stacking to modify the presentation layer stack by adding and/or removing layers to achieve a display result improving the user experience and providing enhanced perception of content displayed. In some examples, the layer stacking is modified by applying an additional layer parameter to at least one of the layers of the visual content. In other examples, the layer stacking modification adjusts one or more of the current parameters of at least one presentation layer. A variety of combinations are considered for adjusting the perceived brightness of visual content to allow for a user to comfortably view visual content. The selection of modifications such as layer stacking, parameter addition of adjustment is designed to achieve a desired user perception a perceived brightness adjustment to facilitate a desired user perception (e.g., perceived brightness level) of the visual content.

A device display system 100 as in FIG. 1, having a perception controller 106, also referred to herein as a display content controller or a display brightness controller, acts to adjust the perceived brightness level of visual content as a function of the visual content. In this way, visual content is prepared for publication to provide an enhanced user experience. For example, the device display system modifies the visual content to cause a perceived adjustment to the brightness of the displayed content. In some embodiments, the device display system modifies the perceived brightness of visual content by adjusting an opacity of a visual media layer, adding and/or adjusting the color or shade of a background layer of the visual content, applying or adjusting a filtered layer over the visual media layer, and/or a combination of thereof. For example, the device display system may decrease the perceived brightness of visual content by decreasing the opacity of the visual media layer, thereby increasing the visibility of a dark colored background layer through the visual medial layer. As another example, the device display system may increase the perceived brightness of visual content by increasing the opacity of the visual media layer, thereby decreasing the visibility of a dark colored background layer through the visual medial layer.

The device display system 100 analyzes visual content and determines a desired brightness level for the visual content prior to display. For example, the device display system determines an initial brightness level of the visual content and then determines the desired brightness level. The device display system then adjusts parameters of the presentation layers for display of the visual content so as to achieve the desired brightness level. This may be done in a variety of ways including a graduated level of control to facilitate a smooth transition between visual content. This may also include adjusting the perceived brightness level immediately or after a given period of time after the visual content is presented to allow the user's perception of the visual content to make a smooth transition. Adjusting the perceived brightness level of each item of visual content provides a consistent user experience as the perceived brightness level of each item of visual content is normalized, regardless of the brightness level of the original visual content.

Multiple criteria and parameters describing the visual content may be used for adjusting the brightness level of the visual content. One such criterion is overall brightness of the colors present in the visual content, such as by using pixel values or other methods of color calculation. In the case where multiple interfaces or kinds of visual media are transitioned or compared, an analysis of the previous visual content or interface presented to the user may be conducted. For example, the brightness level of the previous visual content may be used to determine the desired brightness level of subsequently presented visual content.

FIG. 1 illustrates a device display system 100 for display of visual content on a display device and configured for adjusting the perceived brightness of the visual content, according to some example embodiments. As shown, the device display system 100 includes a display module 102 for presenting visual content to a user. The visual content displayed on the display module 102 is provided as a set of multiple layers, including a background layer, a visual media layer, and/or multiple other layers, which may include filter layers. The display module 102 may be part of a display device, such as a mobile device, television smartphone, tablet, computer monitors, human machine interface (HMI), and the like. For example, the display device may include some or all if the components of system 100 shown in FIG. 1. The display module 102 of the device display system 100 uses backlighting technology, such as a light crystal diode (LCD) display, or other display technologies such as organic light-emitting diode (OLED), to illuminate/present visual content. The present disclosure applies to these and other technologies and adjusts the perceived brightness of visual content based on the visual content or stream of visual content displayed, environmental conditions, and other conditions in which the display device is operating. The present disclosure is not reliant on display device brightness control, but rather adjusts the perceived brightness of the content preparation for publishing to display on the display device.

As explained earlier, some display devices (e.g., mobile devices) include light sensors to determine the environmental lighting. For example, the light sensors may include an ambient light sensor and/or a camera. The environmental information is used to adjust the brightness level of the display (e.g., screen) for operation within the current context or location. The user may change location influencing the brightness setting or may be relatively stationary and watching different videos or scrolling through a variety of visual content. In each of these situations, the brightness of the display is adjusted as a function of the environmental information rather than the visual content. As a result, the user may be presented with an inconsistent viewing experience based on the conditions under which individual items of visual content were created. For example, some visual content may appear brighter or darker than others. The device display system 100 alleviates this issue by adjusting the perceived brightness of visual content based on the visual content rather than just the environmental information.

As illustrated in the device display system 100 of FIG. 1, display controller 104 controls the visual content for display and is coupled to the display module 102; the display module publishes the visual content in response. The display controller is controller by a main controller 106 or central processing unit for operational control of the device display system 100 and interface with the device of which the device display system 100 is a part. The controller 106 that processes data, instructions, commands and other information within the device display system 100. The controller 106 is coupled to sensors 108, a camera system 110, an ambient light sensor system 112, and a visual media input module 120. The controller 106 is further coupled to display content controller 104, discussed in detail herein.

The display device system 100 maintains settings in the display controller 104 to control the brightness and parameters of display module 102, such as to adjust the screen brightness in response to data received from the ambient light sensor system 112 or the camera system 110. These settings may be input to the display controller 104 from user input and selection module 114 or may be determined by the device display system 100 such as by the controller 106 and/or the display controller 104.

The display content controller 104 controls the background layer, visual media layer, medial layers and/or filter layer(s) to create a presentation of the visual content to a user. The display content controller 104 controls the perceived brightness of the displayed content by adjusting display parameters of the visual content, such as by adjusting the opacity, color, and/or shade of the individual layers of the visual content, adjusting the stacking order of the layers, applying a filter layer, and the like. The display content controller 104 receives visual content from visual media input 122 and evaluates the visual content for brightness level and other parameters to determine a control strategy for the presentation layers. The visual media input module 122 may receive/access the visual content and/or other information from a local data store (e.g., display memory 118), an external source through an application installed on the display device system 100, from the Internet or other network, from the camera system 132, and so forth.

During the analysis, the display content controller 104 evaluates parameters of the visual content to determine a current brightness level of the visual content in relation to a desired brightness level of the visual content. For example, the display content controller 104 may determine the current brightness level of the visual content by analyzing the pixels of the visual content, such as by determining pixel values or other methods of color calculation. The display content controller 104 can determine a value indicating the current brightness level of the visual content and determine whether to adjust the perceived brightness of the visual content based on a comparison of the value to a threshold value or value range that indicates the desired brightness level for the visual content. The threshold value may be a static value or dynamically determined value based on various inputs, such as sensor input indicating the current environmental lighting conditions of the display device system 100, previously presented visual content, and the like.

The display content controller 104 can determine whether to adjust the perceived brightness level of the visual content based on the comparison of the value indicating the current brightness level of the visual content to the threshold value. For example, if the value falls below the threshold value, the display content controller 104 can determine that the perceived brightness level of the visual content should be increased. Alternatively, if the value is greater than the threshold value, the display content controller 104 can determine that the perceived brightness level of the visual content should be decreased. Alternatively, if the value falls within a specified range of the threshold value, the display content controller 104 can determine that the perceived brightness level of the visual content should not be altered.

The display content controller 104 can provide data indicating the outcome of the analysis to the visual content processing unit 120. For example, the output can indicate whether the perceived brightness level of the visual content should be modified, whether the perceived brightness level should be increased or decreases, and a degree to which the perceived brightness level should be increases or decreased.

The visual content processing unit 120 receives the output of the display content analysis module 116 and adjusts the display parameters of the visual content accordingly to achieve the desired brightness level of the visual content. Control decisions may be implemented by circuitry or computer readable medium operation in the display content analysis module 116, the visual content processing unit or a combination of both. Each of the display content analysis module 116 and the visual content processing unit 120 may include computer processing units. The control decisions and strategies determine to make an adjustment and then implement accordingly by instructing brightness control module 142, layer control module 146 and/or stack hierarchy control module 148. The brightness control module 142 is adapted for adjusting the opacity, color, and/or shading of one or more layers of the visual content. For example, the brightness control module 142 may decrease the opacity of the visual media layer to increase the visibility of darker background layer to reduce the perceived brightness of the visual content. Alternatively, the brightness control module 142 may increase the opacity of the visual media layer to decrease the visibility of the background layer to increase the perceived brightness of the visual content. As another example, the brightness control module 142 may darken or lighten a filter layer applied on top of the visual media layer to decrease or increase the perceived brightness of the visual content accordingly. The layer control module 146 controls application of additional layers to presentation layers for display of the visual content. The stack control layer 148 controls change in the composition of the stacking layers and/or adjusts the stacking order of the presentation layers.

The display content controller 104 is coupled to display memory 118, which may be incorporated within the display content controller, to store information of prior visual media, such as parameter settings, control decisions and/or strategies, and so forth. This information may also be used to determine a current display control of the current visual content, such as a look up table of conditions to controls. The adjusted presentation layers for display of the visual content is provided to display module 102, which causes display of the visual content available to the user. In some examples, a user may select different options for presentation of visual content, where the options are provided to the display content controller 104 as preferences for specific type of adjustments. This option allows the user to select which adjustments and controls of the presentation layer are preferred.

As other examples, the brightness control module 142 may both adjust the opacity of the visual media layer and insert or modify the color/shade of a background layer in an effort to reduce the perceived brightness of the visual content. In addition, or separately, the brightness control module 142 may add a filtering layer on top of the visual media layer which provides more granular control over the perception of color and contrast of the visual content displayed to the user. The display content controller 104 communicates with the display controller 104 and controller 106 to control the various layers published or presented on the display module 102.

The device display system 100 has a main controller or processor in communication with perception controller 106 coupled to the display controller 104 to provide information from the various sensors, including sensors 108, camera system 110, and ambient light sensor system 112. In some examples, the device display system 100 uses the ambient light sensor data to make a general brightness adjustment to the display module 102 and the visual content analysis module 122 makes a content-specific brightness adjustment through the presentation layers. In some examples, the display content controller 104 uses both the ambient light sensor data and the visual content analysis to make decisions to change the perceived brightness level of visual content presented on display module 102. In other examples, the display controller 104 uses the camera as a means to provide a general brightness adjustment to the display module 102.

In various examples the user of the display device may override the display content controller 104 decision and implement a specific control or strategy for adjusting brightness. In addition to brightness control, the display content controller 104 may also implement control of a portion of a full screen image, such as for picture-in-picture, where a first adjustment for the visual content of a first portion of the display screen is different than a second adjustment applied to a second portion, or window, of the display screen. Some examples provide an overlay color for the visual content and/or control color filters positioned over the visual media layer or other presentation layers.

The display controller 104 is further illustrated to have modules for control of various layers in the presentation layer stack, such as illustrated for display 160 comprised of multiple layers 162. The display controller 104 includes multiple modules or units for controlling aspects of the display, including a decision engine 170 to determine and implement the controls as a function of the visual content and the viewing criteria. Decision engine 170 receives information from the color sampling module 150 relating to the color of the visual image content. Other inputs from modules to decision engine 170 include those from user preferences unit 152, viewing environment unit 154, sensor(s) 156, and visual stream information unit 158. A visual content criteria 172 provides information on the use of the various inputs to the decision engine 170 and the priority of each. Once the decision engine 170 determines the desired perception and controls to achieve same, the decision engine 170 controls the various modules for blending 140, color control 142, dimming control 144, layer control, 146 and stack hierarchy 148. Other systems may implement different content-based controls to achieve a variety of user perceptions. Some embodiments may store a mapping of visual content and visual stream data for specific adjustments of the opacity of the background layer or the use of filters. received information, the Similarly, the filter layer module.

The display controller 104 is further detailed as having multiple modules for providing inputs to a decision engine 170. The modules include a color sampling module 150 to sample the color of the visual media to identify a major color or colors, where the information is provided to decision engine 170 to determine a color or colors of a background layer of a presentation layer stack. In some examples a user preferences module 152 provides preference information from the user or determined by the system 100 based on the prior user control of the display. Viewing environment module 154 determines a lighting or other condition in which the user is viewing the visual media. This may a day, night, inside, outside determination or may consider a user viewing in a moving vehicle, such as a car, train, and so forth. In these situations, the decision engine 170 considers this information in determining background layer color, filter selection, dimming control and so forth. The decision engine 170 also receives information from sensor(s) on a device housing the display device or module 102, such as for ambient light conditions and other environmental conditions available from sensor(s). Additionally, a visual stream module 158 provides information on brightness, color and other differences from one frame to a next, which is useful in modern mobile apps as short videos are viewed in succession, wherein videos may have individual characteristics different from other videos. These differences may result in a poor user experience, and therefore, the present inventions alleviate this issue.

The display controller 104 in some examples includes a visual content criteria module 172 provided to the decision engine 170 and guiding the operation and decisions of decision engine 170. The visual content criteria module 172 may have predetermined settings for content satisfying various criteria and when such criteria are detected the visual content criteria module 172 provides the predetermined control to decision engine 170. These predetermined controls may be stored in a look up table or other memory storage device.

Continuing with system 100, the decision engine 170 controls various modules including a color control module 142 that is applied to any of the layers, and is used to adjust the background layer when such decision is made. The blending module 140 applies blending techniques to multiple layers to achieve a desired perception condition. The decision engine 170 further controls layers 146, such as to add and control filtering layers, overlay layers and so forth. With respect to the various layers, the decision engine 170 controls the brightness module 142 which may operate to dim any of the layers, including the visual media layer. The decision engine 170 further determines a stack hierarchy to define the relation of the layers to each other in a presentation layer stack. The decision engine 170 determines how images are rendered on display module 102, such as a display screen. The display content controller 104 and the decision engine 170 control the presentation layers 162 to improve user perception and user experience. The analysis and control of the parameters of the presentation layers enables a smooth experience for a user changing visual content, for example by scrolling or swiping, flipping through screens and so forth.

Figure 2:
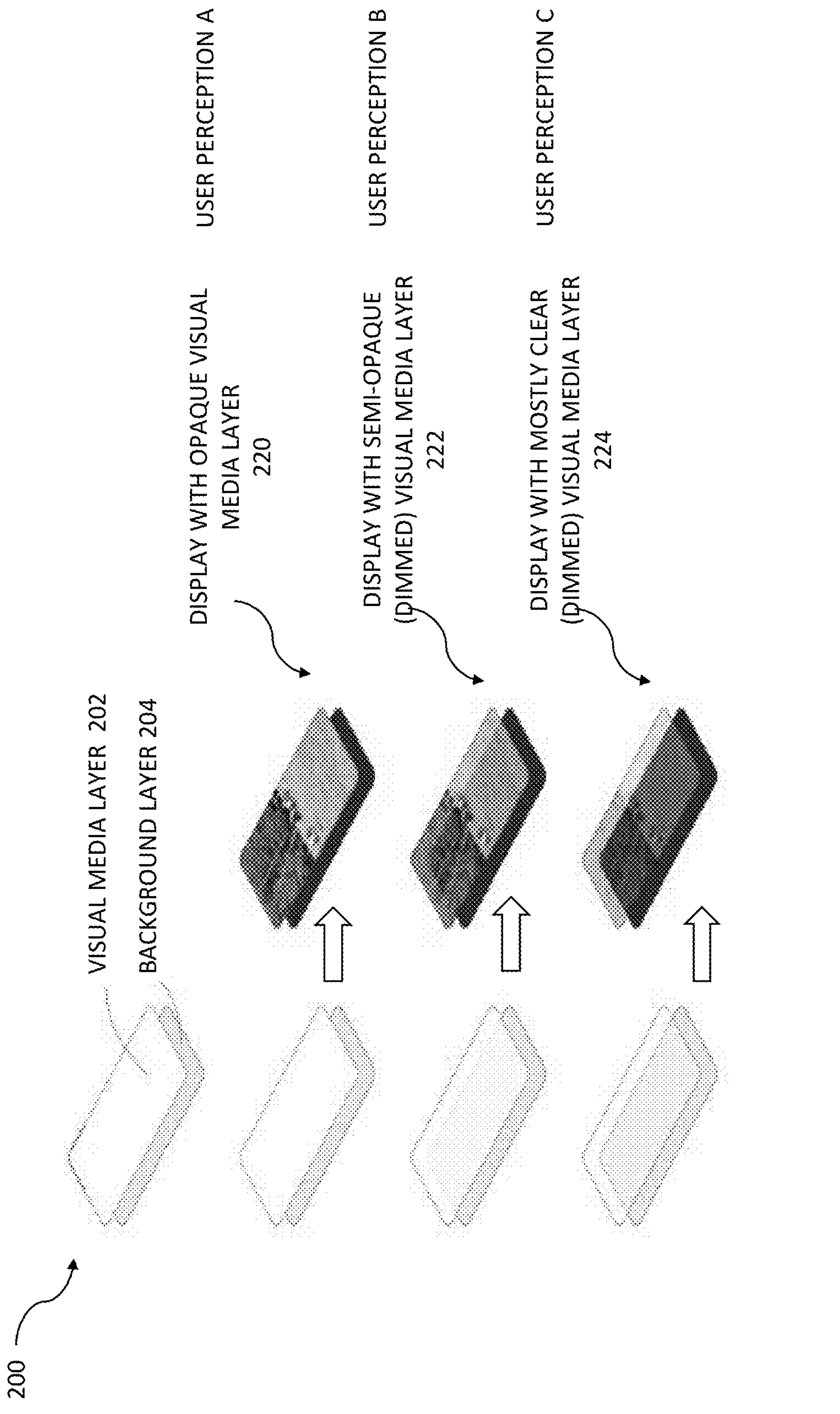
FIG. 2 is a diagrammatic representation of layers for presentation of content on a mobile device and adjustment of a visual media layer, in accordance with some examples.

As discussed above, the visual content is presented for display as a set of presentation layers and are illustrated in FIG. 2, where control of the individual layers determines the user perception of the visual content. In a simple model, there is a visual media layer displaying the visual content or images over a base layer that is a defined uniform color. In some examples, the color base layer, or background layer, is determined by sampling the coloring of the visual content. The background layer is dynamically adjusted from this sampling. As the layers are digitally controlled to adjust the components of color, brightness, opacity and other visual components, all of these controls impact the user perception of the display, and therefore are subject to changing characteristics of the visual content.

There may be many different conditions in which a device is used that impact perception of a same video. For example, watching a nature video with lots of sunlight within the video may be perceived differently in a dark room than outside in the daylight. In this case, the present embodiments achieve a user perception according to the video displayed and the environment in which the video is viewed. In another example, a user may switch between a variety of different video contents, such as to form a stream of video content. This occurs often when using apps on a mobile phone to view short clips or videos in succession. A first video may have a low brightness level and a next successive video has a higher brightness level. Without adjustment to the display, the user experience may be less than ideal. In examples described herein, adjustments are made to display layers to improve user perception. Such adjustments are made to control of each layer and are based on the color, brightness and other display components of visual media content, the environment in which the video is viewed, disparity in successive videos, and so forth. A user may stream a variety of different content, each having a color, brightness and hue.

The layers of the presentation layer stack are digitally controlled for color and opacity in relation to the image content, the viewing environment, the relation to other frames and the relation of layers to each other. There is a base layer and video media layer displaying content, each of which may be controlled to achieve a desired user perception. In some embodiments, a color of the base layer, or background layer, is adjusted as a function of the coloring of the visual media layer displaying the content. FIG. 2 illustrates display layer configuration 200 of two layers including a visual media layer 202 over a background layer 204, or base layer. The visual media content is an outdoor scene with green as a major color component in the image. To improve the user perception, the backing layer 204 coloration calculation is influenced by the green color of the visual media and may be determined by the previous frame, next frame or visual content to be displayed.

For a first user perception A, the display 220 has a default opaque visual media layer 202 over a colored background layer 204. The visual media layer 202 is not adjusted but rather is presented as received. The visual media layer 204 is presented without change to brightness, opacity or color. The user perception A is a clear, crisp image. The background layer 204 color is adjusted according to sampling of the visual media layer 202 and results in a color based on the visual media.

The next example, user perception B, display 222 of the same visual media content has the identically colored background layer 204, as the background layer color is a function of the same visual media. Here the visual media layer is adjusted to increase the opacity to achieve user perception B. The background layer 204 is the same color as in perception A, but the visual media layer 202 adjustment results in user perception B. The adjustment as illustrated increases the opacity of the visual media layer 202; however, other modifications of visual components may be implemented to achieve a specific desired user perception. In these embodiments, perception is improved for the user.

Continuing with adjustments to the visual media layer 202, a display 224 of the same visual media has the identically colored background layer 204, as the background layer color is a function of the same visual media. Here the visual media layer 202 is adjusted to increase the opacity to achieve user perception C. The background layer 204 is the same color as in perceptions A and B, but the visual media layer adjustment results in user perception C. The adjustment as illustrated continues to increase the opacity of the visual media layer 204; however, other modifications of visual components may be implemented to achieve a specific desired user perception. In these embodiments, perception is controlled by adjusting the display and color inputs to the visual media layer 202. Comparison of user perception A, B and C illustrates the change in user perception achieved by adjusting the visual parameters of the visual media layer 202.

Figure 3:
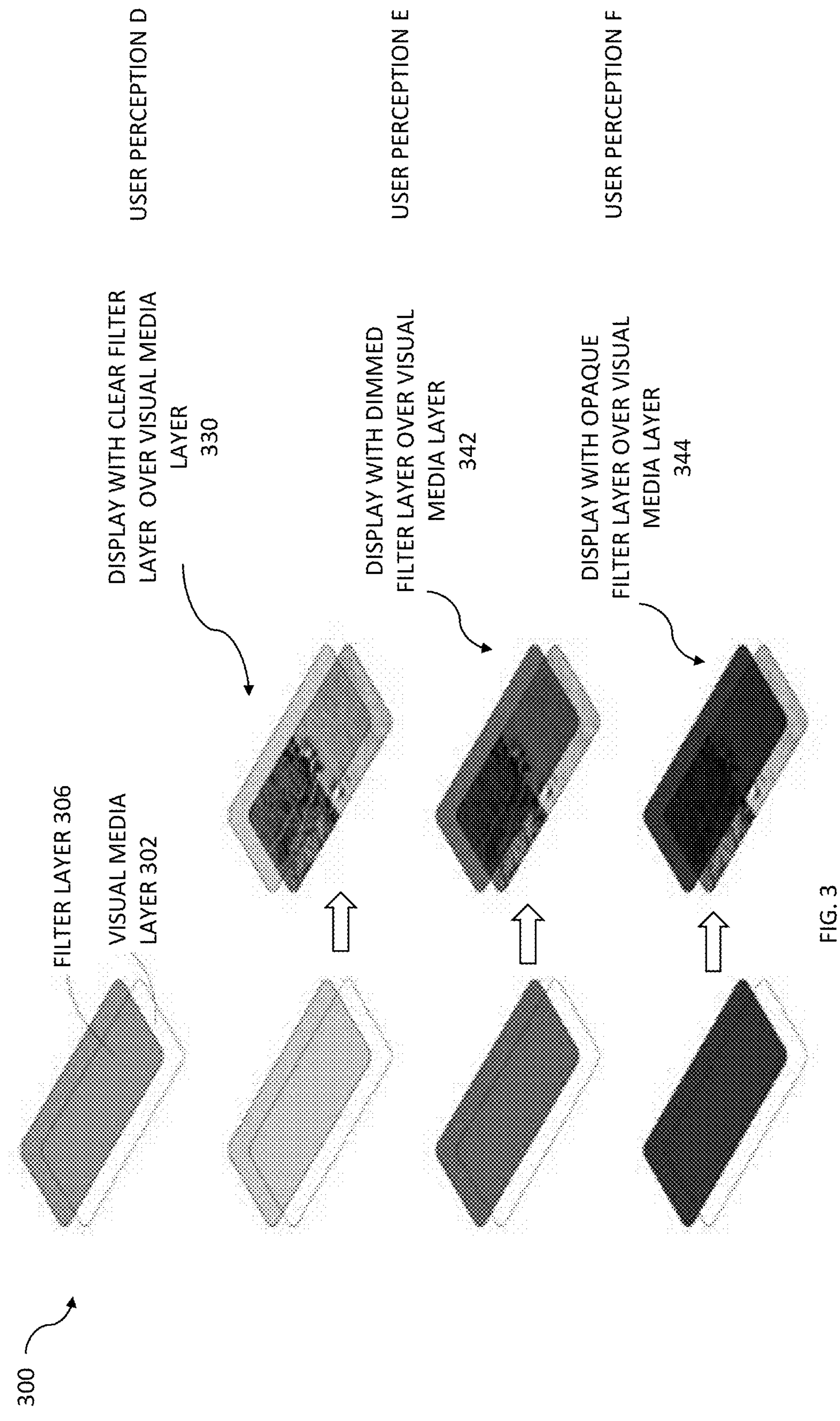
FIG. 3 illustrates a diagrammatic representation of a filter layer applied to a presentation layer stack, in accordance with some examples.

In FIG. 3, a portion of a layered scenario 300, a filter layer 306 is added to the visual media layer 302 to achieve a perception D in display 330. For illustration, in this example, the visual media layer 302 condition remains constant, while the filter layer 306 is adjusted to achieve different user perspectives. The background layer is not illustrated, however, there may be any number of layers in addition to the filter layer 306 and visual media layer 302. Using a clear filter layer 306 over visual media layer 302, as in display 330, results in user perception D. Here the image is clear and crisp. By dimming the filter layer 306, as in display 342, perception E is a darker view of the visual media. And continuing to dim the filter layer 306 further to an almost fully opaque condition, as in display 344, results in user perception F. Here the visual component of opacity for the filter is adjusted to low transparency. In some examples, the filter layer 306 may be dynamically adjusted in relation to the color sampling of the visual media layer 302.

An advanced filter layer 306 may apply blending of two or more layers to achieve a desired result. A blending mode is an effect used in digital display technology to determine how two or more layers are blended with each other to achieve a resultant display. The color of various layers and of the visual media layer are where each pixel is There are a variety of blending options, including dissolve mode that takes random pixels from one or more layers and adds these to a given layer for effect. Blending allows darkening or lightening of an image as well as consideration of the different colors, RGB, for use with a base color, such as that of the background layer. There are a variety of blend modes that may be applied to the filter layer in order to achieve a desired result. Color burn mode inverts the background by dividing it by the filter color and inverting with the visual media layer. An overlay mode applied to the filter layer will make the visual media appear lighter or darker depending on the coloring applied to the filter layer.

Figure 4:
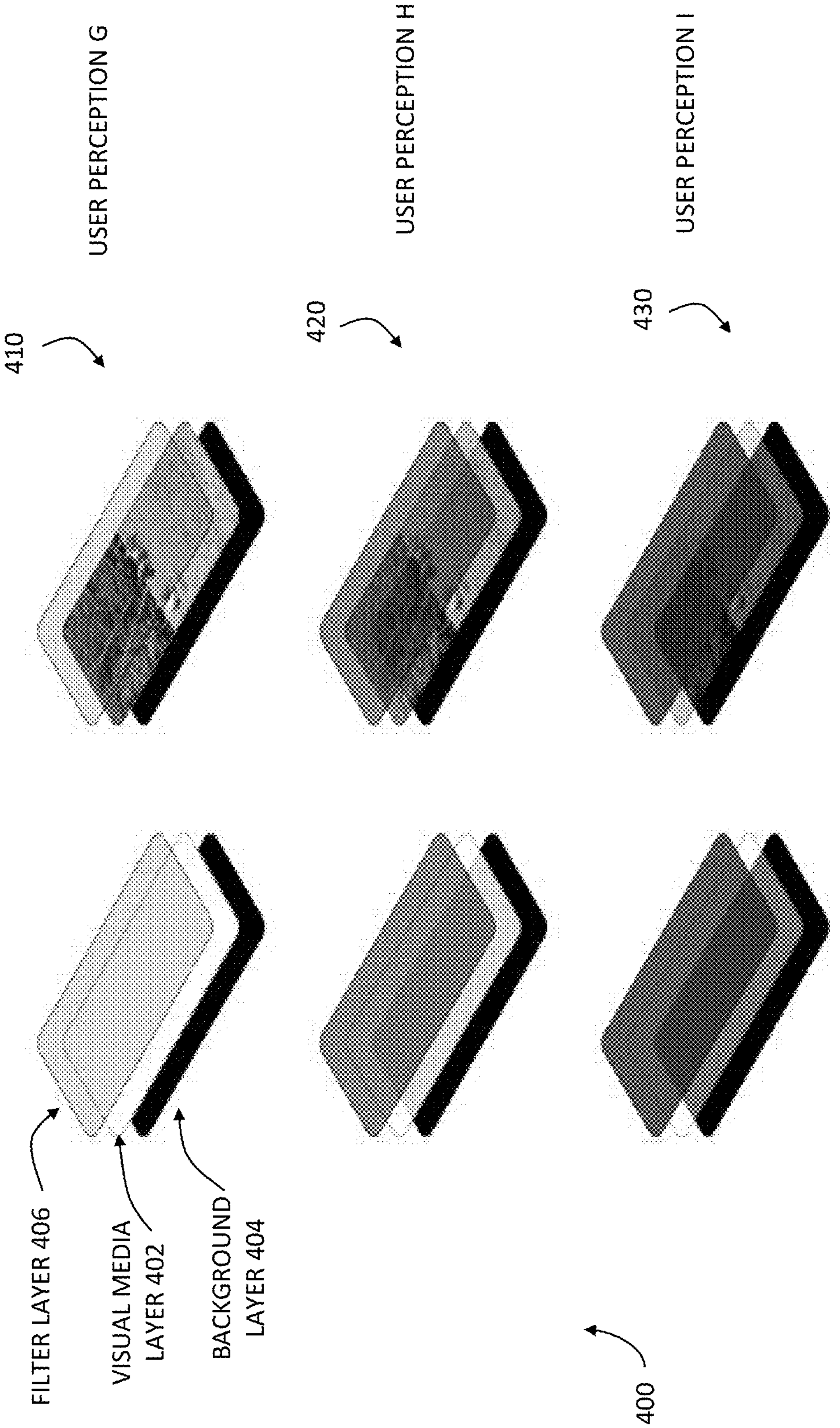
FIG. 4 illustrates a diagrammatic representation of a filter layer applied to a presentation layer stack and color adjusted background layer, in accordance with some examples.
Figure 5:
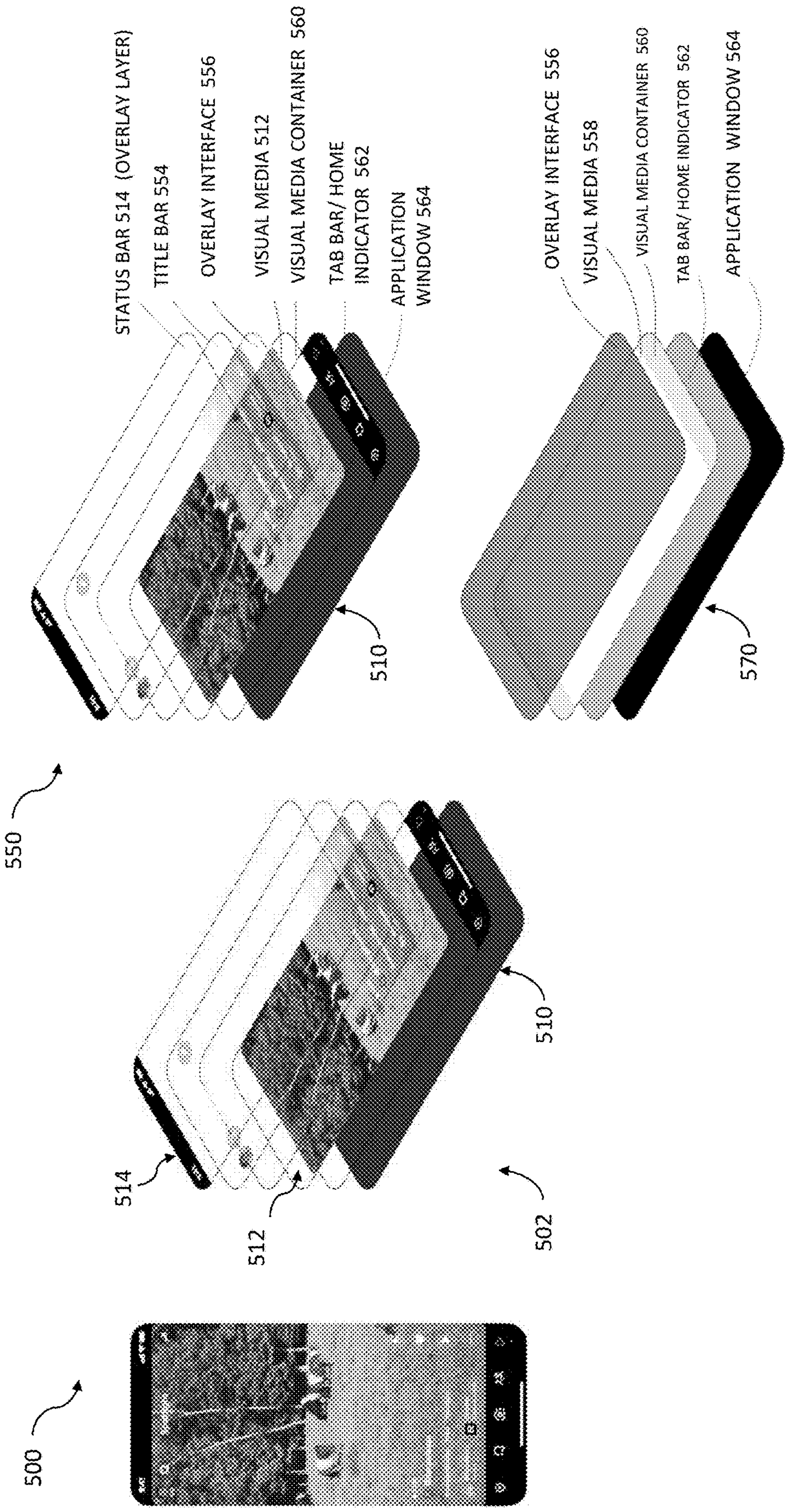
FIG. 5 illustrates a diagrammatic representation of a multi-layered presentation layer stack applying blend modes to achieve a user perception, in accordance with some examples.

FIG. 4 illustrates an example combining some of these techniques, such as achieving a user perception by adjusting the background layer 404 based on image coloring of visual media layer 402, and also applying a filter layer 406, where the color and opacity are controlled such that the visual media appears as desired. The configuration 400 includes a visual media layer 402 sandwiched between a background layer 404 and a filter layer 406. Three examples are illustrated for achieving different perceptions G, H and I. In a first example the display 410 has a first coloring and opacity of the filter layer 406 to achieve user perception G. The background layer 404 may be a default color, such as black, or may be a color derived from sampling the visual image content of visual media layer 402. A next example has a display 420 achieving a user perception H by dimming filter layer 406 with a same background layer 404. In these examples, the background layer 404 is colored according to the sampling of the visual media layer 402. In a third example, the filter layer 406 is further dimmed to darken the presentation of visual image layer 402 resulting in user perception I for display 430. In these examples, the filter layer 406 is dynamically adjusted in relation to the visual media layer 402 and/or other viewing criteria.

Figure 6:
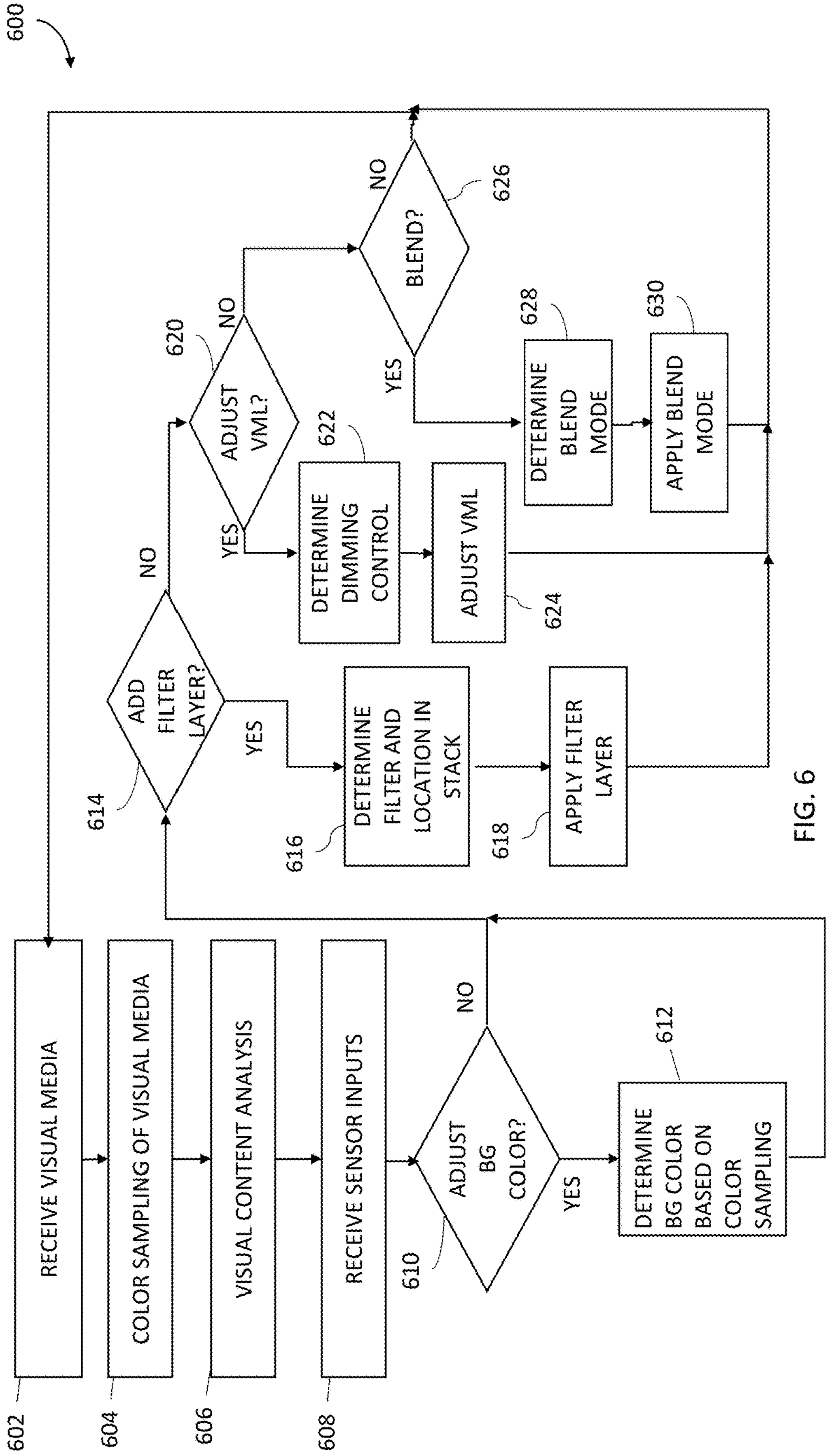
FIG. 6 illustrates a method for a decision engine in a display controller, in accordance with some examples.
Figure 8:
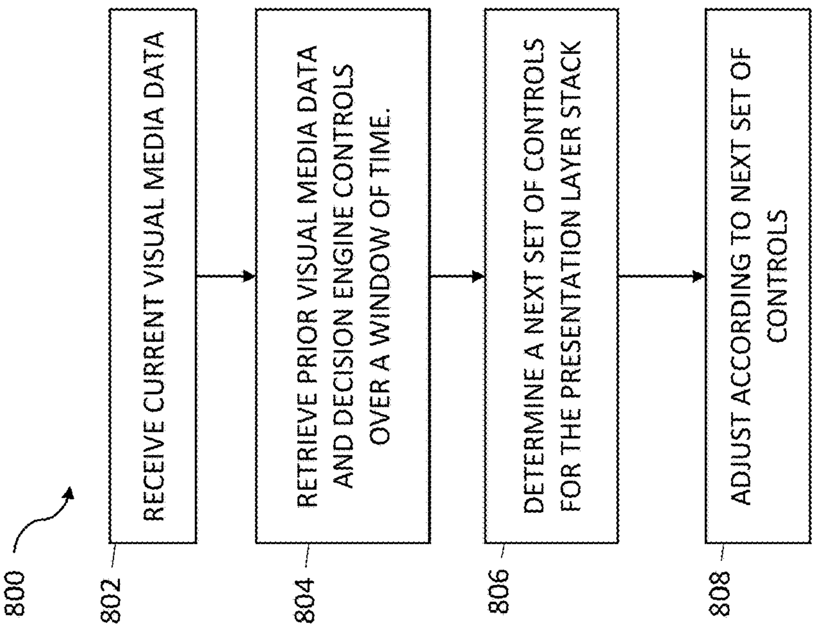
FIGS. 7 and 8 illustrate methods for a decision engine in a display controller, in accordance with some examples.
Figure 7:
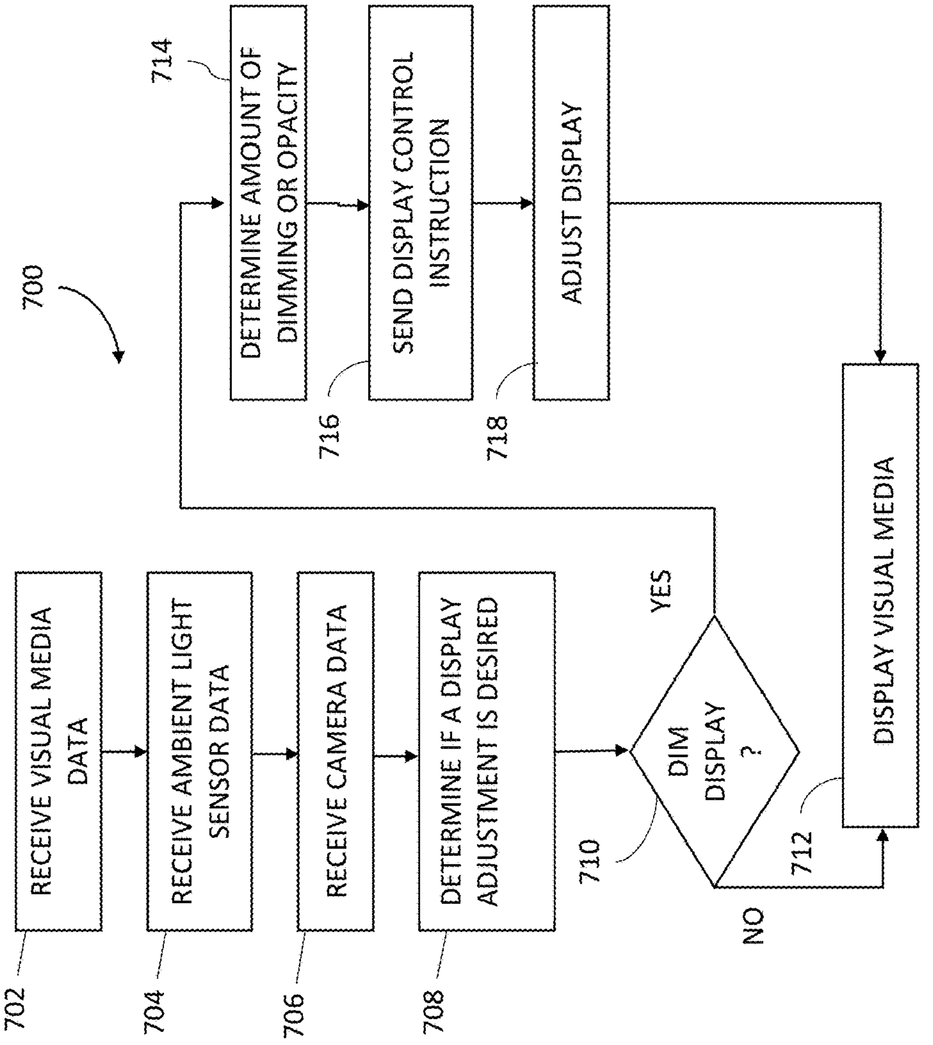
Figure 9:
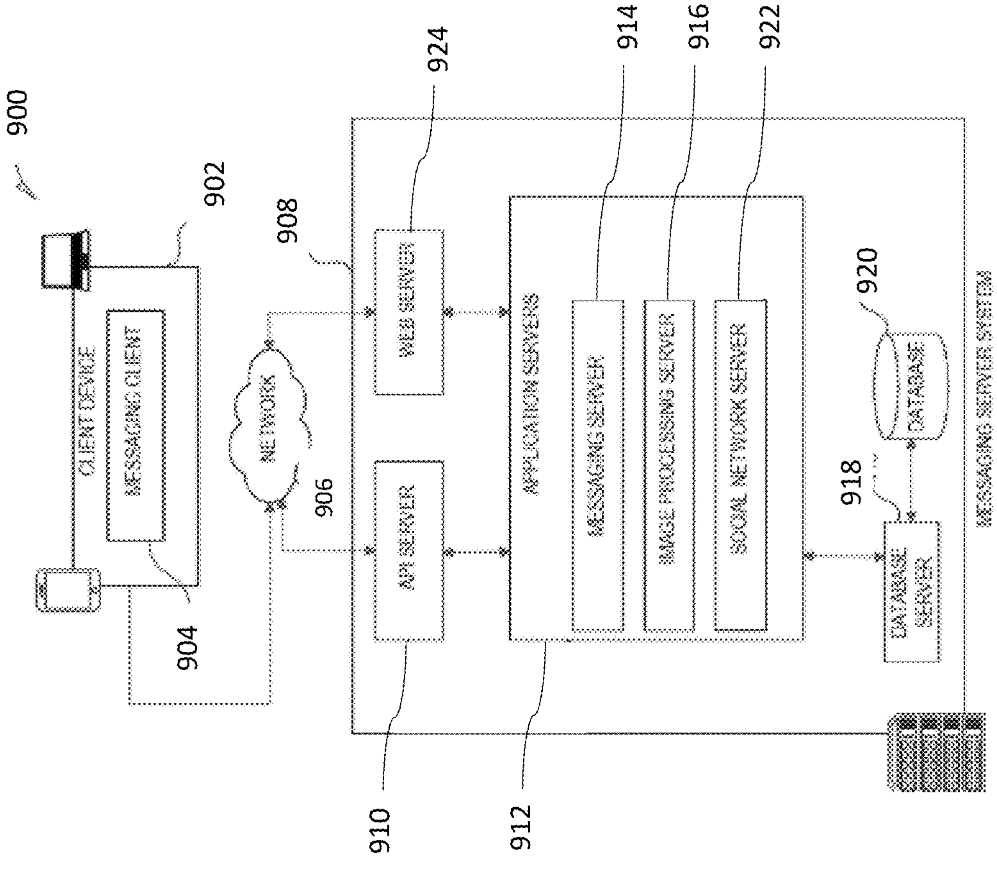
FIG. 9 is a diagrammatic representation of a machine in the form of a computer system within which a set of instructions may be executed for causing the machine to perform any one or more of the methodologies discussed herein, in accordance with some examples.

FIGS. 6, 7 and 8 illustrate methods for operation of decision engine 170 of FIG. 1. The method 600 begins receiving visual media 602, such as a video stream, and sample the colors in the visual media, 604 to identify a major color. There are several methods for sampling pixels in a frame or series of frames to identify a color and hue. The process 600 then continues to visual content analysis, 606, to identify the viewing criteria of the visual image for presentation. Sensor inputs are received, 608, such as for ambient light condition and so forth. The decision engine 104 determines if the background color is to be adjusted based on color sampling, 610, and then color adjustment is made to the background layer, 612. The decision engine 104 determines if a filter or filters are to be added to the presentation layer stack, 614, and if so determines the filter and location in the presentation layer stack, 616. The filter is applied, 618. The process then determines if an adjustment is to be made to the visual media layer, 620, and if so, then determines dimming control, 622, and adjust the visual media layer, 624, accordingly. The process also determines if blending of layers is to part of the adjustments, 626, and then determine a blend mode, 628, and applying same, 630.

FIG. 7 illustrates additional methods performed by decision engine 104 to receive visual media data, 702, ambient light sensor data, 704, and camera data 706, to determine if a display adjustment is desired, 708. The process adjustment to the visual media layer to dim the display, 710, is applied, 712, and the amount of dimming or opacity determined, 714. Display instructions are sent to the display device 716 to adjust the display, 718.

FIG. 8 illustrates process 800 to receive current visual media data, 802, and retrieve prior visual media data and the decision engine control decisions over a window of time, 804. The process 700 then determines a next set of controls for the presentation layer stack, 806, and makes adjustments according to a next set of controls, 808.

As described herein, a device display system having a perception controller acts to adjust the perceived brightness level of visual content as a function of the visual content. Adjustment may be made to individual layers of a presentation stack of layers, multiple layers, the stacking order, filtering layers and a combination thereof. In this way, visual content is prepared for publication to provide an enhanced user experience. For example, the device display system modifies the visual content to cause a perceived adjustment to the brightness of the displayed content. The device display system may modify the perceived brightness of visual content by adjusting an opacity of a visual media layer, adding and/or adjusting the color or shade of a background layer of the visual content, applying or adjusting a filtered layer over the visual media layer, and/or a combination of thereof. The device display system may decrease the perceived brightness of visual content by decreasing the opacity of the visual media layer, thereby increasing the visibility of a dark colored background layer through the visual medial layer. As another example, the device display system may increase the perceived brightness of visual content by increasing the opacity of the visual media layer, thereby decreasing the visibility of a dark colored background layer through the visual medial layer.

The present inventions may be implemented in a mobile device or other computing device having a display. As used herein computer-readable storage medium refers to both machine-storage media and transmission media. The terms machine-readable medium, computer-readable medium and device-readable medium mean the same thing and may be used interchangeably in this disclosure. Machine storage medium refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium, device-storage medium, computer-storage medium mean the same thing and may be used interchangeably in this disclosure.

What is claimed is:

1. A method comprising:

receiving visual content for display on a display device, the visual content including a plurality of layers in a presentation stack of layers including a background layer and visual media layer;

evaluating the visual content to determine at least one display parameter;

determining a desired brightness level for displaying the visual content on a display of the display device based on the at least one display parameter;

determining adjustment of display parameters of the presentation stack of layers to achieve the desired brightness level for displaying the visual content, yielding adjusted visual content;

adjusting the display parameters of the presentation stack of layers; and causing presentation of the adjusted visual content on the display device.

2. The method of claim 1, wherein adjusting the display parameters comprises modifying a brightness level of the background layer.

3. The method of claim 2, wherein modifying the brightness level of the background layer comprises adjusting an opacity of the background layer to increase visibility of the adjusted visual content.

4. The method of claim 1, wherein adjusting the display parameters comprises adding a filter layer to the presentation stack of layers.

5. The method of claim 2, wherein adjusting the display parameters comprises reordering a set of layers of the presentation stack of layers.

6. The method of claim 1, further comprising:

evaluating an ambient light score; and using the ambient light score in evaluating the visual content to determine the desired brightness level for displaying the visual content.

7. The method of claim 1, wherein evaluating the visual content further comprises evaluating the visual content with respect to a prior visual content.

8. The method of claim 7, wherein evaluating the visual content further comprises evaluating the visual content with respect to a stream of visual content.

9. The method of claim 1, wherein adjusting the display parameters comprises applying a filter layer to the presentation stack of layers.

10. The method of claim 9, wherein applying the filter layer to the presentation stack of layers comprises:

selecting the filter layer based on an initial brightness level of the visual content and the desired brightness level for displaying the visual content.

11. The method of claim 1, wherein adjusting the display parameters of the presentation stack of layers comprises:

determining a configuration for the presentation stack of layers.

12. The method of claim 1, further comprising determining the desired brightness level for displaying the visual content on the display of the display device is further based on brightness levels of at least one previously presented visual content.

13. The method of claim 11, wherein determining the desired brightness level for displaying the visual content on the display of the display device is further based on an ambient light score determined based on sensor data describing a current environment of the display device.

14. A display device comprising:

one or more computer processors; and one or more computer-readable mediums storing instructions that, when executed by the one or more computer processors, causes the display device to perform operations comprising:

receiving visual content for display on a display device, the visual content including a plurality of layers in a presentation stack of layers including a background layer and visual media layer;

evaluating the visual content to determine at least one display parameter;

determining a desired brightness level for displaying the visual content on a display of the display device based on the at least one display parameter;

determining adjustment of display parameters of the presentation stack of layers to achieve the desired brightness level for displaying the visual content, yielding adjusted visual content;

adjusting the display parameters of the presentation stack of layers; and causing presentation of the adjusted visual content on the display device.

15. The display device of claim 14, further comprising a display controller comprising:

a decision engine for determining the desired brightness level;

a visual content module coupled to the decision engine, the visual content module for analyzing the visual content to extract parameters and provide extracted parameters to the decision engine; and a background layer module adapted to receive instructions from the decision engine and apply the instructions to adjust a brightness of the background layer.

16. The display device of claim 15, further comprising:

a sensor module adapted to receive sensor information from sensors and provide this information to the decision engine.

17. The display device of claim 16, wherein sensor information includes an ambient light score.

18. The display device of claim 15, further comprising:

a visual stream module adapted to evaluate the visual content with respect to a prior visual content and identify parameters of the prior visual content to provide to the decision engine.

19. The display of claim 14, wherein adjusting display parameters of the presentation stack of layers comprises:

determining an order of layers in the presentation stack of layers.

20. A non-transitory computer-readable medium storing instructions that, when executed by one or more computer processors of a display device, causes the display device to perform operations comprising:

receiving visual content for display on a display device, the visual content including a plurality of layers in a presentation stack of layers including a background layer and visual media layer;

evaluating the visual content to determine at least one display parameter;

determining a desired brightness level for displaying the visual content on a display of the display device based on the at least one display parameter;

determining adjustment of display parameters of the presentation stack of layers to achieve the desired brightness level for displaying the visual content, yielding adjusted visual content;

adjusting the display parameters of the presentation stack of layers; and causing presentation of the adjusted visual content on the display device.

* * * * *